United States Patent
Hirata et al.

(10) Patent No.: US 8,323,518 B2
(45) Date of Patent: Dec. 4, 2012

(54) FABRICATION METHOD AND FABRICATION APPARATUS OF HEAD USING NEAR FIELD LIGHT

(75) Inventors: Masakazu Hirata, Symbiosis (SG); Manabu Oumi, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 837 days.

(21) Appl. No.: 12/309,799

(22) PCT Filed: Jul. 3, 2007

(86) PCT No.: PCT/JP2007/063258
§ 371 (c)(1),
(2), (4) Date: Mar. 13, 2009

(87) PCT Pub. No.: WO2008/015865
PCT Pub. Date: Feb. 7, 2008

(65) Prior Publication Data
US 2009/0208641 A1 Aug. 20, 2009

(30) Foreign Application Priority Data
Aug. 1, 2006 (JP) .................... 2006-209880

(51) Int. Cl.
*G11B 13/08* (2006.01)
*G11B 9/12* (2006.01)

(52) U.S. Cl. .......... 216/24; 216/11; 216/52; 369/112.27

(58) Field of Classification Search .................... 216/11, 216/24, 22, 40, 41, 52; 369/112.27
See application file for complete search history.

(56) References Cited

U.S. PATENT DOCUMENTS

| 4,155,106 A * | 5/1979 | Muraoka et al. ............. 360/112 |
| 6,304,527 B1 * | 10/2001 | Ito et al. ..................... 369/44.23 |
| 2002/0001283 A1 * | 1/2002 | Niwa et al. ............... 369/112.27 |

FOREIGN PATENT DOCUMENTS
JP    2006329968 A  * 12/2006

* cited by examiner

*Primary Examiner* — Lan Vinh
*Assistant Examiner* — David Kaufman
(74) *Attorney, Agent, or Firm* — Adams & Wilks

(57) ABSTRACT

A method of manufacturing a near-field optical head. A first projection shaped in a quadrangular pyramid is formed on a surface of a substrate for providing a near-field optical element of the near-field optical head. A second projection shaped in a frustum of quadrangular pyramid is formed on the surface of the substrate for providing an air bearing surface of the near-field optical head. A metal film is formed on at least one surface of the first projection and the metal film is connected with a resistance meter through a conduction wiring for detecting an electrical resistance of the metal film. The first and second projections and the metal film are polished while the resistance meter detects an electrical resistance of the metal film and until the detected electrical resistance reaches a predetermined value such that a top surface of the first projection has a specified size and becomes flush with a surface of the second projection providing the air bearing surface.

10 Claims, 9 Drawing Sheets

FIG. 5
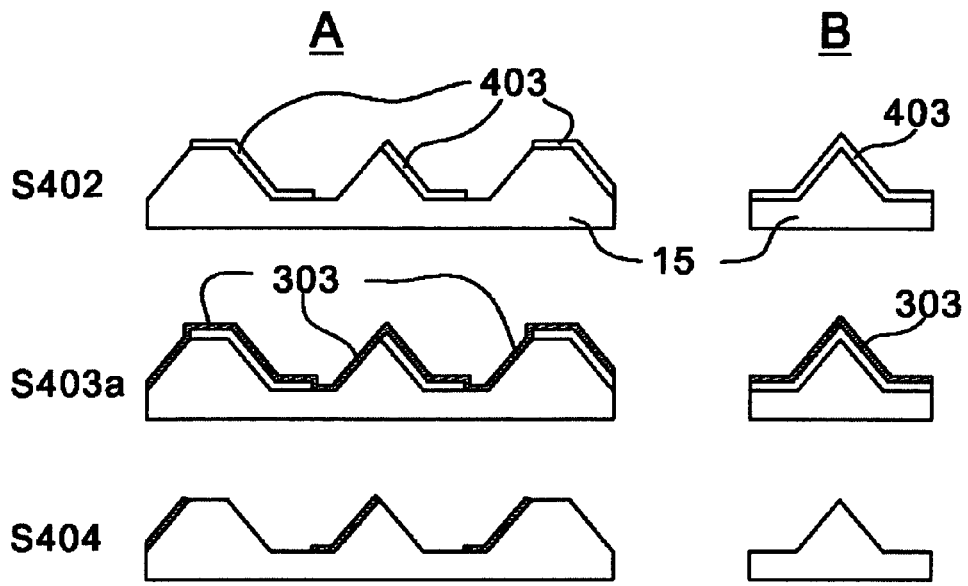
FIG. 6A  FIG. 6B
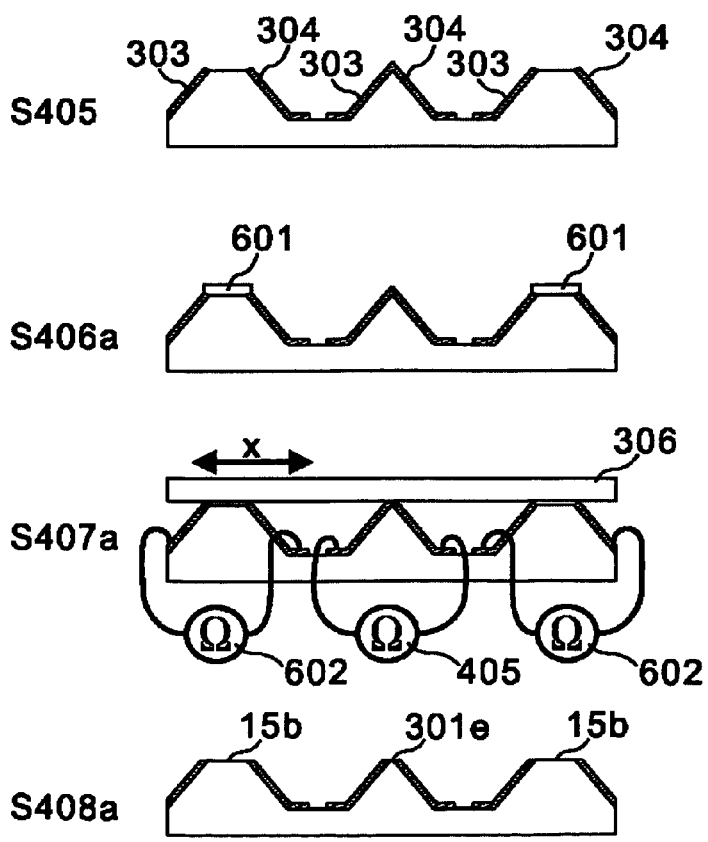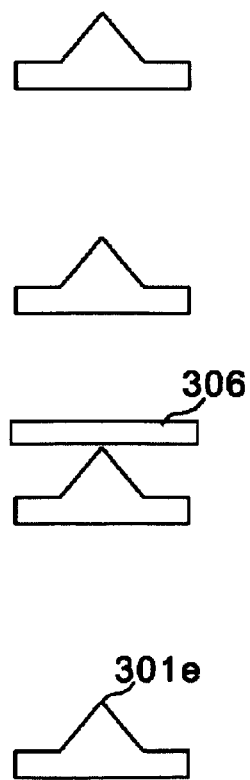

FABRICATION METHOD AND FABRICATION APPARATUS OF HEAD USING NEAR FIELD LIGHT

CROSS-REFERENCE TO RELATED APPLICATION

This application is a U.S. national stage application of International Application No. PCT/JP2007/063258, filed Jul. 3, 2007, claiming a priority date of Aug. 1, 2006, and published in a non-English language.

BACKGROUND OF THE INVENTION

1. Technical Field

The present invention relates to a fabrication method and a fabrication apparatus of a head using near field light mounted with a near field optical element.

2. Background Art

For information recording and reproducing apparatuses requiring an increase in capacity and reduction in size, magnetic recording techniques are demanded to achieve higher recording density. The higher the recording density becomes, the smaller a recording area per bit becomes, and the energy of one bit of information comes close to thermal energy at room temperature resulting in thermal fluctuations causing recorded information to be reversed or erased, for example.

In the in-plane recording method generally used in magnetic recording techniques, magnetism is recorded so that the magnetization direction is oriented in the in-plane direction of a recording medium. However, in this method, recorded information loss, for example, tends to occur because of thermal fluctuations as described above. Then, in order to avoid such failure, the recording method is shifting to the use of a perpendicular recording method in which magnetization signals are recorded in the direction perpendicular to the recording medium. This method is the method in which magnetic information is recorded according to the principles that a magnetic monopole is brought close to a recording medium. According to this method, a recording magnetic field is directed to the direction almost perpendicular to a recording film. Information recorded with the perpendicular magnetic field tends to keep stable energy because it is difficult that the north pole and the south pole form a loop in the recording film surface. Thus, this perpendicular recording method is more resistant to thermal fluctuations than the in-plane recording method.

However, recent information recording and reproducing apparatuses are demanded for much higher density. On this account, in order to suppress the influence of the magnetic domains adjacent to each other and thermal fluctuations to a minimum, such a recording medium having a stronger coercivity is being adopted as a recording medium. Because of this, even according to the perpendicular recording method described above, it becomes difficult to record information on the recording medium.

Then, in order to solve this problem, a hybrid magnetic recording method (near field light assisted magnetic recording method) is provided in which near field light locally heats a magnetic domain to temporarily reduce the coercivity for writing during this period. This hybrid magnetic recording method is the method that uses near field light generated by the interaction between a micro-area and a near field optical element formed on a near field optical head. The near field light is used to produce a light spot having a diameter of a few tens nm or below, which cannot be carried out by existent light because of diffraction limits, and to generate a heat spot in almost the same size.

In the near field optical element, a main problem is to obtain a strong micro-spot of the near field light. To this problem, some shapes are already proposed. In application 1 (JP-A-2001-118543), such a structure is formed in which the outline shape of an optical aperture provided at the tip end of a near field optical element is formed in a triangle and the polarization direction of the incident light is orthogonal to one side of the triangle, whereby a strong near field light is generated, which is localized on that one side (triangular aperture method). In the application 1 (Technical Digest of 6th international conference on near field optics and related techniques, the place country-region Netherlands, Aug. 27-31, 2000, p 100) and application 2 (JP-A-2002-221478), a metal film is formed on two surfaces facing to each other among four side surfaces of a quadrangular pyramid, these two surfaces have a gap below optical wavelengths near the top of the quadrangular pyramid, each of the metal films on the two surfaces has a top with the radius of curvature of a few tens nm or below in the gap part, and a strong near field light localized in the gap part is generated (bow tie antenna method).

Application 1: JP-A-2001-118543
Application 2: JP-A-2002-221478
Non-Patent Publication 1: Technical Digest of 6th international conference on near field optics and related techniques, the place country-region Netherlands, Aug. 27-31, 2000, p 100

In the foregoing techniques described above, for the near field optical element of the triangular aperture method in application 1, the fabrication method is already disclosed, and the element can be relatively easily fabricated. However, for the near-filed light element of the bow tie antenna method in Non-Patent Publication 1 and application 2, because the element requires processing of about a few nm to a few tens nm for shapes of the metal film top and the gap part, extremely advanced micromachining techniques such as an electron beam stepper (electron beam lithography system) and a focused ion beam apparatus are generally needed. For this, a simple fabrication method suited for mass production is sought.

In addition, it is also necessary that a near field optical element is incorporated in a head having an air bearing surface (ABS: air bearing surface) in accuracy of order of a few nm for floating in the air from a medium at a clearance from about a few nm to a few tens, and thus it is demanded to solve this by a fabrication method suited for mass production.

SUMMARY OF THE INVENTION

In order to solve the problems, according to the present invention, a head using near field light including a near field optical element formed of a truncated pyramid having a top face and a plurality of side surfaces and a metal film and including a floating projection having an air bearing surface is fabricated as follows.

First, on one surface of a substrate, a first projection in a pyramid or a truncated pyramid to be the near field optical element after processing and a second projection to be the floating projection similarly after processing are formed.

Subsequently, a metal film is formed on at least one side surface of the first projection.

Subsequently, a sacrificial interconnect is provided on one surface of the substrate, a conductive interconnect electrically connected to the sacrificial interconnect is provided on one surface of the substrate, and the conductive interconnect is electrically connected to an electrical resistance detecting unit.

Subsequently, a flat polishing material is arranged so as to face to one surface of the substrate. The polishing material is used to polish the first projection, the second projection and the sacrificial interconnect while the conduction resistance value is measured by the electrical resistance detecting unit so that the top face of the near field optical element is in a predetermined size and the top face and the air bearing surface are in the same plane.

In addition, in the invention, the metal film can be formed as described below.

A sacrificial layer is deposited on one side surface of the first projection from the direction perpendicular to one side surface, a metal film is deposited on the other side surface facing to at least one side surface, the sacrificial layer deposited on one side surface is removed together with the overlapping metal film, whereby the metal film can be formed on the other side surface.

Moreover, in the invention, in addition to the first projection, the second projection and the sacrificial interconnect, the metal film formed near the top of the first projection is also polished, whereby the end surface of the polished metal film and the top face are in the same plane.

Moreover, in the invention, the sacrificial interconnect can be formed on the first projection, on the second projection, and on a third projection provided near the first projection.

Moreover, in the invention, a metal film placed on two side surfaces of the first projection facing to each other can be the sacrificial interconnect.

According to the invention, because the end point in the polishing step can be detected by the electrical resistance detecting unit, the size of the top face of the truncated pyramid configuring the near field optical element can be a few tens nm or below. Thus, the size of a near field light spot generated from the near field optical element can be a few tens nm or below. Accordingly, the recording density of an information recording and reproducing apparatus mounted with the head using near field light can be improved.

In addition, according to the invention, because the top face of the truncated pyramid configuring the near field optical element and the air bearing surface are formed on the same plane, in operating the information recording and reproducing apparatus, the distance between the top face and the recording medium can be almost the same as the distance between the air bearing surface and the recording medium. Thus, the distance between the top face and the recording medium is a few tens nm or below, and the energy of the near field light generated from the near field optical element can be efficiently transmitted to the recording medium. Accordingly, the recording density and the SN ratio of the information recording and reproducing apparatus can be improved.

In addition, according to the invention, because the near field optical element and the head using near field light having the performance described above can be fabricated with processing techniques at relatively low level, they can be fabricated at low costs as compared with the techniques before.

In addition, according to the invention, the metal film can be formed on the side surfaces of the truncated pyramid configuring the near field optical element. This metal film can further localize the near field light, or the metal film is formed to be the magnetic pole to meet the hybrid magnetic recording method.

In addition, the clearance near the top face of a plurality of the metal films can be a few tens nm or below. The near field light can be further localized, or the leakage flux due to the magnetic pole can be localized. Accordingly, the recording density of the information recording and reproducing apparatus can be improved.

In addition, according to the invention, the sacrificial interconnect is included in the metal film, whereby the end point in the polishing step can be detected highly accurately.

In addition, according to the invention, the sacrificial interconnect is provided on the projection to be the floating projection after processing and on the projection provided near the near field optical element, whereby the end point in the polishing step can be detected highly accurately.

BRIEF DESCRIPTION OF THE DRAWINGS

FIG. 5 shows cross-sectional views depicting another method of fabricating the near field optical element and the near field optical head according to embodiment 1 of the invention;

FIGS. 6A-6B are cross-sectional views depicting another method of fabricating the near field optical element and the near field optical head according to embodiment 1 of the invention;

DETAILED DESCRIPTION OF THE PREFERRED EMBODIMENTS

Hereinafter, the best method for carrying out the invention will be described with reference to the drawings.

Embodiment 1

A near field optical element according to embodiment 1 of the invention, a near field optical head mounted with the near field optical element, and an information recording and reproducing apparatus mounted with the near field optical head will be described with reference to FIGS. 1 to 3.

Figure 1:
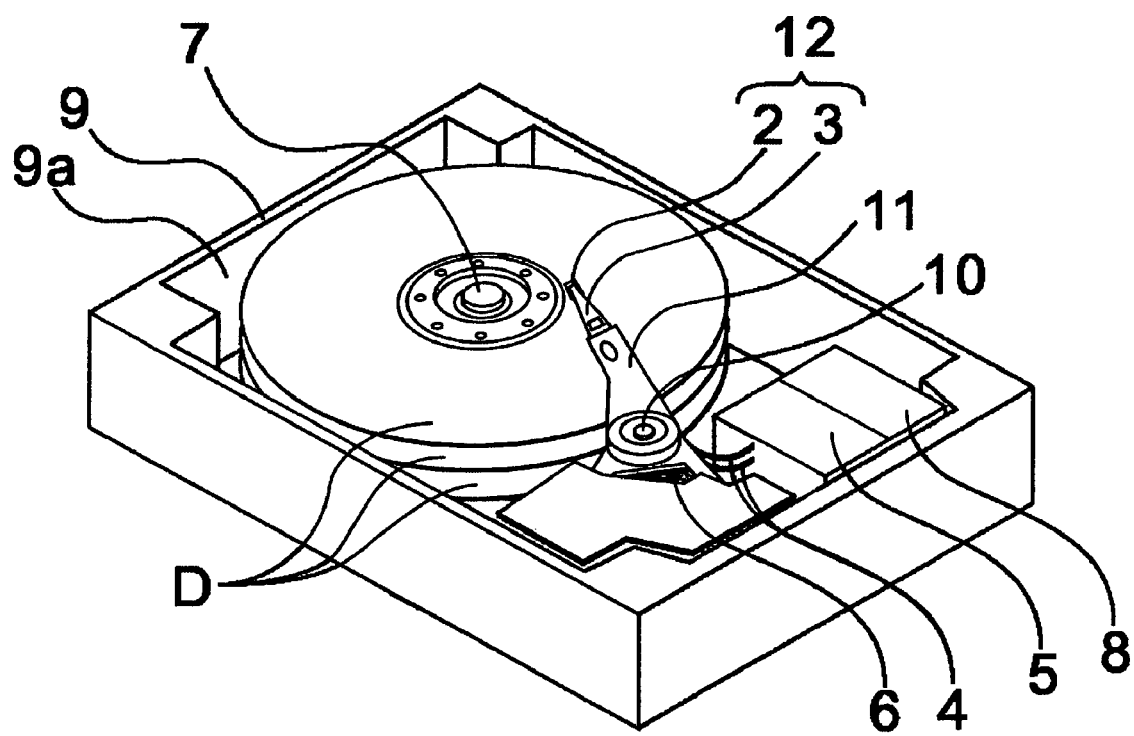
FIG. 1 is a perspective view depicting an information recording and reproducing apparatus using near field light according to embodiment 1 of the invention.

As shown in FIG. 1, an information recording and reproducing apparatus 1 in the embodiment has a near field optical head 2, a suspension 3 that is movable in parallel with the surface of a recording medium (hereinafter, referred to as a disk) D and supports the near field optical head 2 on the tip end side thereof in the pivotable state about two axes parallel with the surface of the disk D and orthogonal to each other, an optical signal controller (light source) 5 that leads a light beam L from the base end side of an optical waveguide 4 into the optical waveguide 4, an actuator 6 that supports the base end side of the suspension 3 and moves the suspension 3 to scan in the direction parallel with the surface of the disk D, a spindle motor (rotating and driving unit) 7 that rotates the disk D in a certain direction, a control unit 8 that processes signals for recording and reproduction and controls the operations of the optical signal controller 5, the actuator 6 and the spindle motor 7, and a housing 9 that accommodates these individual components therein. In addition, the near field optical head 2 and the suspension 3 configure a head gimbal assembly 12.

The housing 9 is formed of a metal material such as aluminum in a rectangular shape seen from the top, and has a recessed part 9a formed therein that accommodates the individual components. In addition, to the housing 9, a cover, not shown, is detachably fixed so as to block the aperture of the recessed part 9a. In almost the center of the recessed part 9a, the spindle motor 7 is mounted, and the center hole of the disk D is fit into the spindle motor 7 to detachably fix the disk D. At the corner of the recessed part 9a, the actuator 6 is mounted. On the actuator 6, a carriage 11 is mounted through a bearing 10, and the suspension 3 is mounted at the tip end of the carriage 11. Then, the carriage 11 and the head gimbal assembly 12 are movable together by drive of the actuator 6 as described above.

In addition, the optical signal controller 5 is mounted in the recessed part 9a so as to be next to the actuator 6. Then, as adjacent to the actuator 6, the control unit 8 is mounted.

Figure 2A:
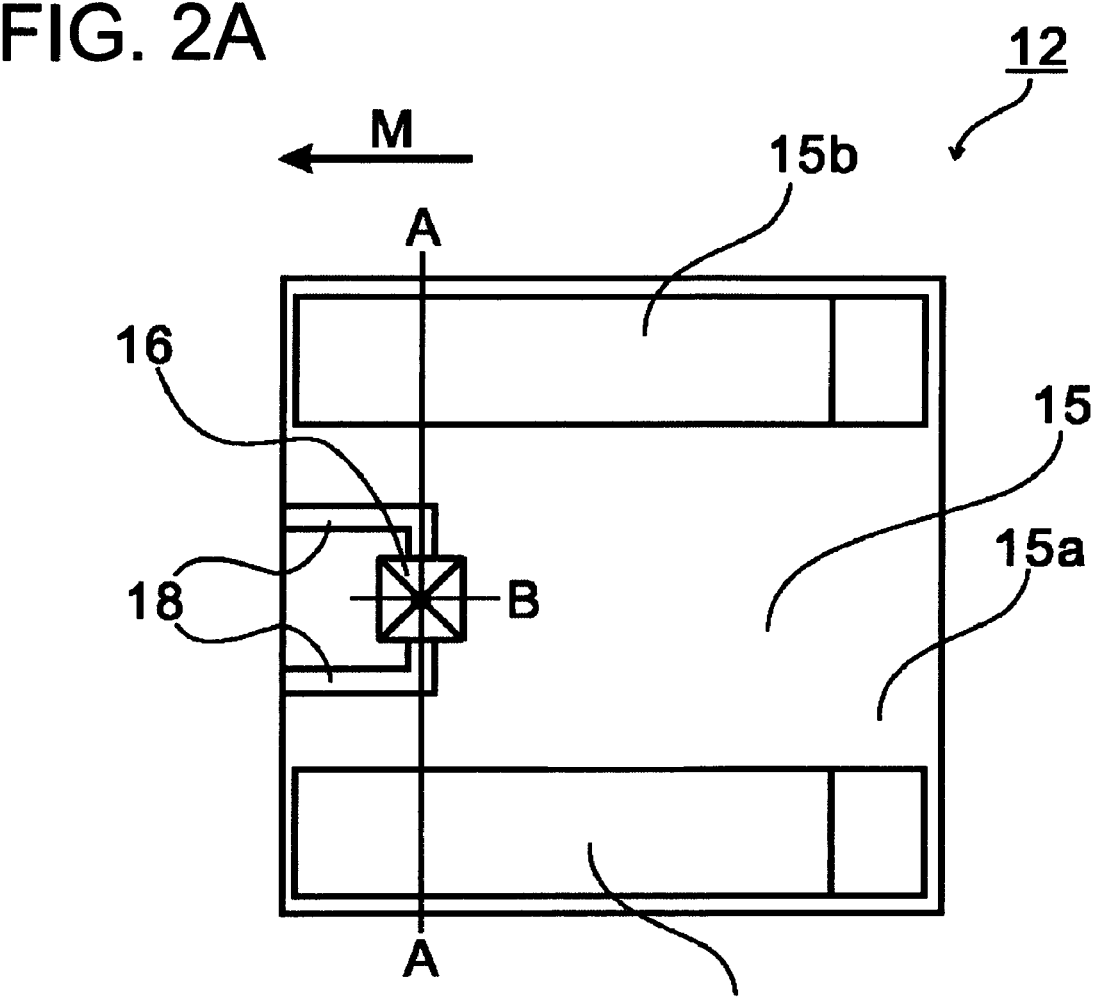
FIGS. 2A-2B show bottom and cross-sectional side views, respectively, of a near field optical head according to embodiment 1 of the invention.
Figure 2B:
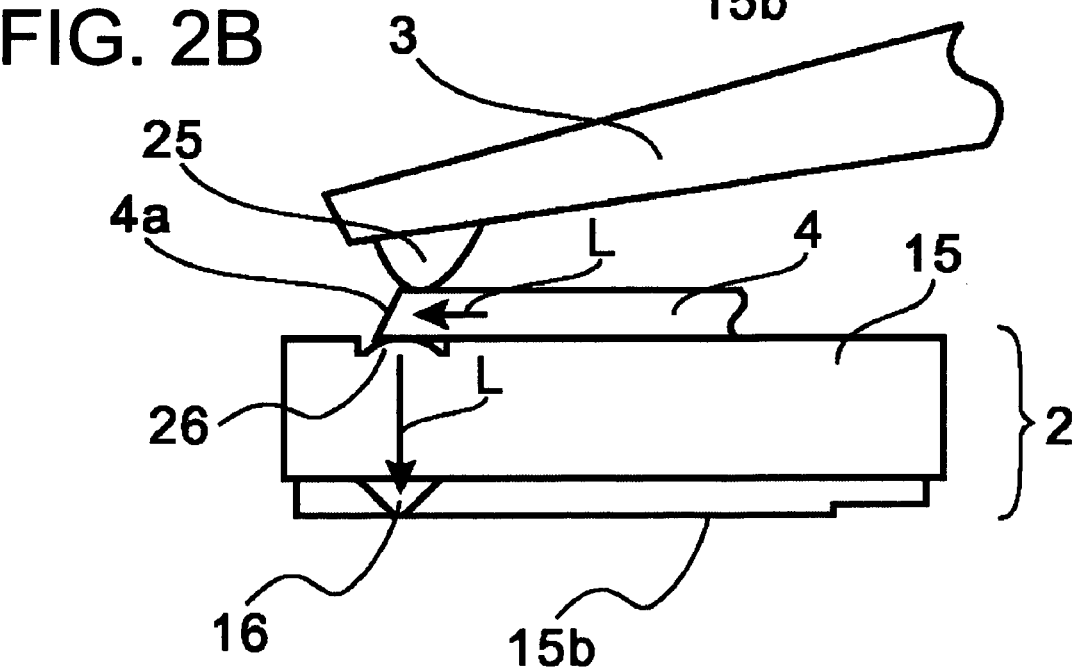

FIG. 2 shows the head gimbal assembly 12 according to the embodiment. In addition, FIG. 2(a) shows a bottom view depicting the near field optical head 2, and FIG. 2(b) shows a cross section depicting the near field optical head 2, the suspension 3, and the optical waveguide 4. In FIG. 2, for clarity of explanations the scale of the individual components of the head gimbal assembly 12 is adjusted for illustration purpose only, and it does not match with the actual dimensions of these components. The same applies for drawings as further described below.

The near field optical head 2 configuring the head gimbal assembly 12 has a slider 15 having an opposed surface 15a facing to the surface of the disk D, a near field optical element 16 that is fixed to the slider 15 and generates near field light, and a light beam guiding unit that leads a light beam L into the near field optical element 16.

The slider 15 is shaped in a rectangular parallelepiped of an optically transparent material such as quartz glass and the size is about a 1 mm square. This slider 15 is supported so as to hang from the tip end of the suspension 3 through a gimbal part 25 in the state in which the opposed surface 15a is faced on the disk D side. This gimbal part 25 is the component whose motion is controlled as it is displaced only about two axes parallel with the flat surface of the disk D.

On the opposed surface 15a of the slider 15, two projections are formed, having an ABS (air bearing surface: Air Bearing Surface) 15b formed thereon which generates pressure for floating due to the viscosity of an air flow produced by the rotating disk D. The length of each of the projections in the moving direction of the disk D is almost equal to the length of one side of the slider 15, the width is about 100 to 500 μm, and the height is about 1 to 10 μm. In the embodiment, a step flat type ABS is taken as an example, having two projections arranged in parallel with the moving direction of the disk D, but the embodiment is not limited to this case, which may be other schemes such as a step-taper type, and a tri-pad type.

The slider 15 receives the force to float above the disk D by the ABS 15b, and also receives the force that holds the slider down to the disk D side by the suspension 3. The slider 15 floats in the state in which it is apart from the surface of the disk D at a few tens nm or below by the balance between forces of these two. In addition, by the function of the gimbal part 25, the slider 15 can stably float even though the surface of the disk D has waviness.

In addition, on the top surface of the slider 15, a lens 26 is formed at the position right above the near field optical element 16. Moreover, on the top surface of the slider 15, the optical waveguide 4 such as an optical fiber is mounted. The tip end of this optical waveguide 4 is a mirror surface 4a at an angle of 45 degrees, and the mounting position is adjusted so that the mirror surface 4a is positioned right above the lens 26. Then, the optical waveguide 4 is connected to the optical signal the controller 5 through the suspension 3, the carriage 11 and the like.

Thus, the optical waveguide 4 is configured to guide the light beam L incident from the optical signal controller 5 to the tip end side, reflect the light in the mirror surface 4a to change the direction, and then emit the light to the lens 26. In addition, the emitted light beam L is condensed by the lens 26, transmitted through the slider 15, and led into the near field optical element 16. In other words, the optical waveguide 4 and the lens 26 configure the light beam guiding unit described above.

To each of two side surfaces of the near field optical element 16 aligned as orthogonal to the moving direction M of the disk D and facing to each other, a conductive interconnect 18 is connected, which is arranged on the opposed surface 15a of the slider 15. The remaining end of the conductive interconnect 18 is extended to the end of the slider 15.

Figure 3:
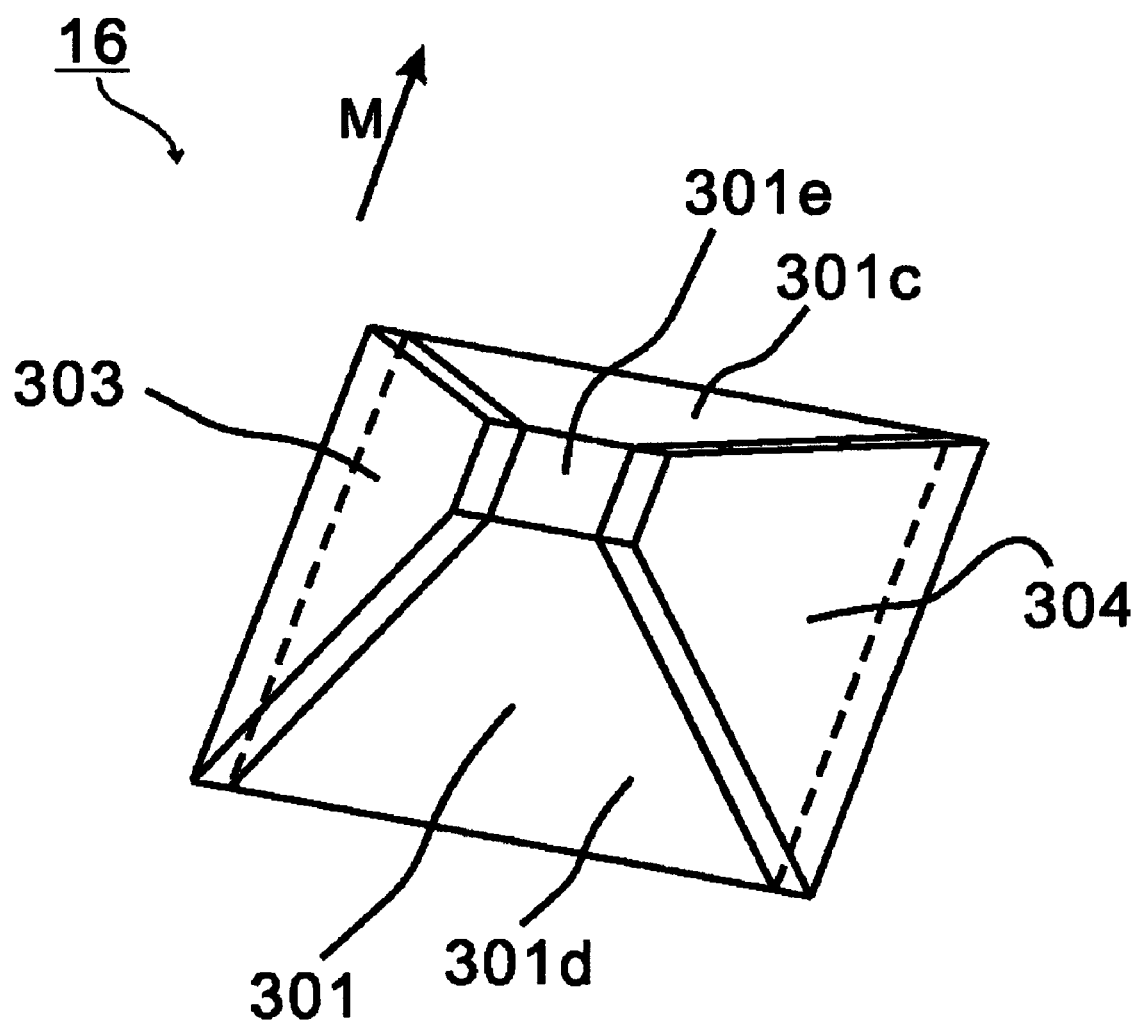
FIG. 3 is a perspective view depicting a near field optical element according to embodiment 1 of the invention.

FIG. 3 shows the outline of the near field optical element according to the embodiment. A truncated quadrangular pyramid 301 is placed on the opposed surface 15a of the slider 15. The truncated quadrangular pyramid 301 is formed of an optically transparent material such as quartz glass. The truncated quadrangular pyramid 301 is formed of four side surfaces 301a, 301b, 301c, and 301d and a top face 301e facing to the disk D. Among the four side surfaces, on the two side surfaces 301a and 301b arranged orthogonal to the moving direction M of the disk D and facing to each other, a first metal film 303 and a second metal film 304 are formed, respectively. For the first metal film 303 and the second metal film 304, a metal material such as Au or Ag is used. The first metal film 303 and the second metal film 304 form a bow tie antenna. The top face 301e is a rectangle, and the length of each side is a few tens nm or below. Therefore, the first metal film 303 and the second metal film 304 have a clearance near the top face 301e, and the size is also a few tens nm or below.

Figure 4:
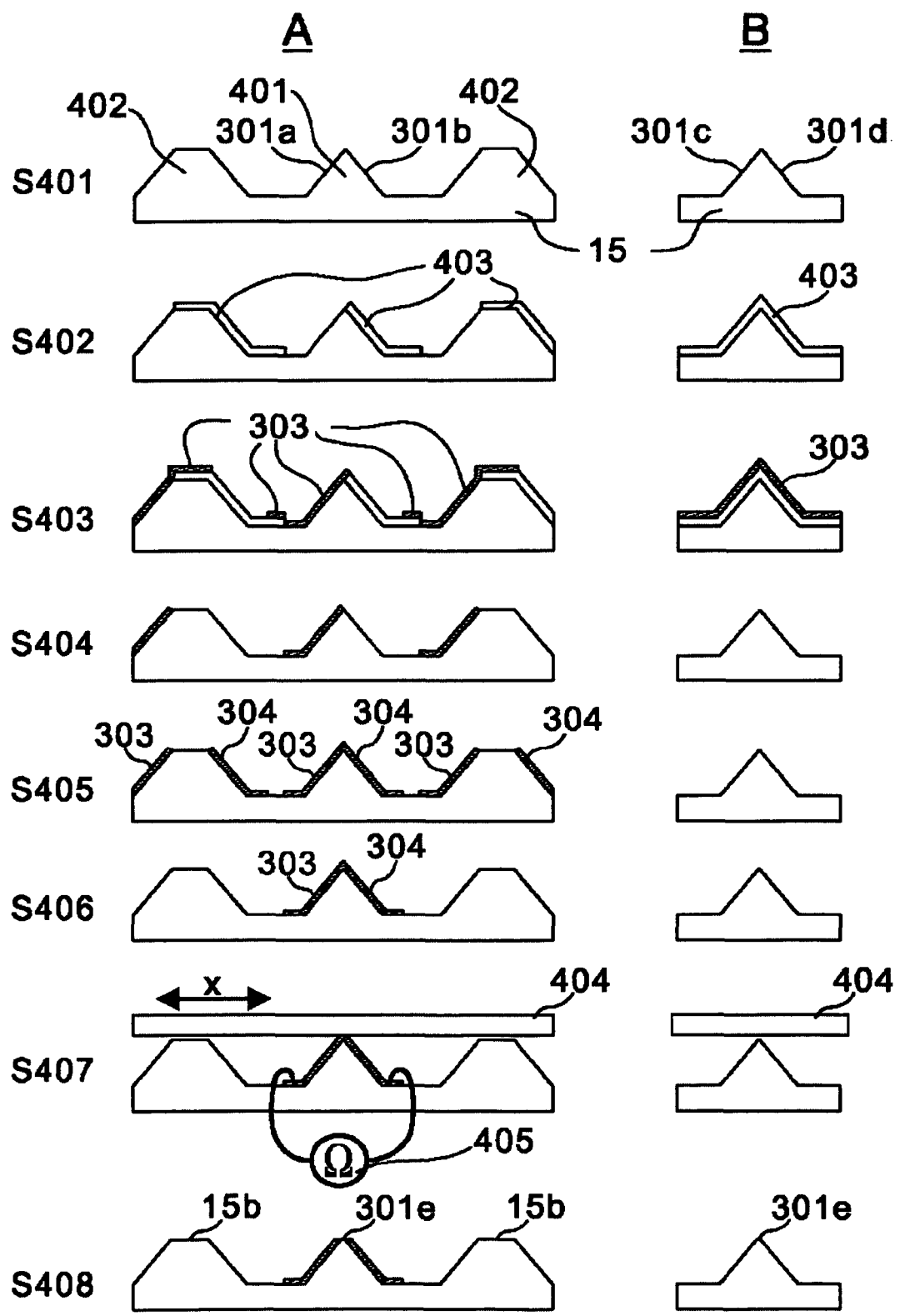
FIG. 4 shows cross-sectional views depicting a method of fabricating the near field optical element and the near field optical head according to embodiment 1 of the invention.

FIG. 4 shows cross sections depicting a method of fabricating the near field optical element and the near field optical head according to the embodiment. As shown in FIG. 2, a cross section A is a section crossing the two ABSs 15b, crossing the first metal film 303, the second metal film 304 and the top face 301e, and perpendicular to the top face 301e. A cross section B is a section crossing the two side surfaces 301c and 301d, not covered with the first metal film 303 and the second metal film 304, and the top face 301e and perpendicular to the top face 301e. In FIG. 4, cross sections in the cross section A are shown on the left in the drawing, and in FIG. 4, cross sections in the cross section B are shown on the right in the drawing.

First, as shown in Step S401, a quadrangular pyramid 401 (first projection) to be the truncated quadrangular pyramid 301 after the fabrication process steps are finished, and truncated quadrangular pyramids 402 (second projection) having the top face to be the ABS 15b after the fabrication process steps are finished are formed on the opposed surface 15a of the slider 15 with photolithography. Although the quadrangular pyramid 401 has the side surface 301a, 301b, 301c, and 301d, it does not have the top face 301e yet. In addition, although for convenience of processing by photolithography, the quadrangular pyramid 402 also has the side surfaces with a slope, it does not influence the operation of the near field optical head because it is smaller than the size of the ABS 15b. Although the heights of the quadrangular pyramid 401 and the quadrangular pyramid 402 are 1 to 10 μm, it is unnecessary here that the height of the two pyramids have to be aligned.

Subsequently, as shown in Step S402, on the side surface 301b, a deposition method of high directivity such as vacuum deposition is used to form a sacrificial layer 403 from the direction perpendicular to the side surface 301b. At this time, the sacrificial layer 403 is also formed not only on the side surface 301b but also on the side surfaces 301c and 301d adjacent to the side surface 301b. The sacrificial layer 403 is not formed on the side surface 301a facing to the side surface 301b because the side surface 301a is hidden because of the directivity of the deposition method. In addition, among the surfaces configuring the truncated quadrangular pyramid 402, the sacrificial layer 403 is formed on the side surfaces nearly parallel with the side surface 301b, the side surfaces adjacent to the side surface 301b, and the top face. The sacrificial layer 403 is formed of an Al film, and the film thickness ranges from a few tens nm to a few hundreds nm.

Subsequently, as shown in Step S403, on the side surface 301a, a metal film forming method of high directivity such as vacuum deposition is used to form the first metal film 303 from the direction perpendicular to the side surface 301a. At this time, the first metal film 303 is formed not only on the side surface 301a but also on a part of the sacrificial layer 403 and on the side surfaces of the truncated quadrangular pyramid 402 nearly parallel with the side surface 301a.

Subsequently, as shown in Step S404, the sacrificial layer 403 is removed. At this time, the first metal film 303 placed on the sacrificial layer 403 is also removed, and only the first metal film 303 placed on the side surface 301a and on the side surfaces of the truncated quadrangular pyramid 402 nearly parallel with the side surface 301a is left (lift-off process). For removing the sacrificial layer 403, an aqueous solution having a main component of a phosphoric acid is used.

Subsequently, as shown in Step S405, the similar steps as steps from Steps S403 to S404 are repeated to form the second metal film 304 placed on the side surface 301b. Here, the first metal film 303 placed on the side surface 301a and the second metal film 304 placed on the side surface 302b are electrically connected to each other near the top of the quadrangular pyramid 401. In addition, also on the side surfaces of the truncated quadrangular pyramid 402 nearly parallel with the side surface 301b, the second metal film 304 is formed.

Subsequently, as shown in Step S406, the first metal film 303 and the second metal film 304 placed on the side surfaces of the truncated quadrangular pyramid 402 are removed. For this step, photolithography is used.

Subsequently, as shown in Step S407, a polishing material is arranged in parallel with the slider 15, and as indicated by X in FIG. 4, the polishing material 404 is moved in parallel with one surface of the substrate to polish the surface of the slider 15 for removing the metal film formed near the top thereof. At this time, to the first metal film 303 and the second metal film 304, an ohmmeter 405 is connected through the conductive interconnect 18. Near the top of the quadrangular pyramid 401, the first metal film 303 and the second metal film 304 are electrically connected to each other. However, when polishing is conducted until the top of the quadrangular pyramid 401 is brought into contact with the polishing material 404, the first metal film 303 and the second metal film 304 do not conduct to each other. More specifically, the first metal film 303 and the second metal film 304 configure a sacrificial interconnect that changes electrical resistance by being polished. At this time, because the resistance value measured by the ohmmeter 405 suddenly rises, the moment at which the top of the quadrangular pyramid 401 is brought into contact with the polishing material 404 can be determined.

When the polishing is continued slightly from the moment, as shown in Step S408, the top of the quadrangular pyramid 401 is cut to form the top face 301e. In addition, the top face of the truncated quadrangular pyramid 402 is also similarly cut to from the ABS 15b. At this time, the top face 301e and the ABS 15b are in the same plane. For example, the polishing material 404 is used to polish the quadrangular pyramid 401 and the truncated quadrangular pyramids 402 until the value of the electrical resistance reaches a predetermined value so that the top face 301e of the quadrangular pyramid 401 is formed in a predetermined size and the top face 301e and the ABSs 15b (air bearing surface) are arranged on the same plane. This predetermined value indicates the resistance value of the metal film (sacrificial interconnect) when the top face 301e and the ABSs 15b (air bearing surface) are arranged on the same plane.

After that, the formation of the lens 26 and connection to the optical waveguide 4 are conducted, and then the near field optical head 2 is completed.

According to the embodiment, because the timing of terminating polishing can be known by the ohmmeter 405, the size of one side of the top face 301e can be a few tens nm or below. More specifically, the clearance between the first metal film 303 and the second metal film 304 near the top face 301e can be a few tens nm or below, and the size of the near field light spot generated between the first metal film 303 and the second metal film 304 can be a few tens nm or below. Thus, the recording density of the information recording and reproducing apparatus 1 using the near field light can be improved.

In addition, according to the embodiment, because the top face 301e and the ABSs 15b can be formed on the same plane, in operating the information recording and reproducing apparatus 1, the distance between the top face 301e and the disk D can be almost the same as the distance between the ABS 15b and the disk D. Therefore, the distance between the top face 301a and the disk D is a few tens nm or below, and the energy of the near field light generated between the first metal film 303 and the second metal film 304 can be efficiently transmitted to the disk D. Accordingly, the recording density and the SN ratio of the information recording and reproducing apparatus 1 can be improved.

In addition, according to the embodiment, because the near field element in the order of a few tens nm or below can be prepared with techniques at relatively low level, the near field element can be prepared at low costs as compared with the techniques before.

Further, for the deposition of the first metal film 303 in Step S403, a deposition method of high directivity such as vacuum deposition is used. However, as shown in Step S403a in FIG. 5, deposition may be conducted by using a deposition method of low directivity such as a sputtering method. In addition, also for deposition of the second metal film 304, deposition of low directivity such as a sputtering method may be similarly used. Therefore, the yields and the productivity in preparation can be improved.

In addition, in Step S406, the first metal film 303 and the second metal film 304 placed on the side surfaces of the truncated quadrangular pyramid 402 are removed. However, without doing this, as shown in Step S406a in FIG. 6, a sacrificial interconnect 601 is formed on the top face of the truncated quadrangular pyramid 402, whereby the conduction may be achieved between the first metal film 303 and the second metal film 304 placed on the side surfaces of the truncated quadrangular pyramid 402. After that, as shown in Step S407a, an ohmmeter 602 is connected to the first metal film 303 and the second metal film 304 placed on the side surfaces of the truncated quadrangular pyramid 402, and as similar to Step S407, the ohmmeter 405 is connected to polish the surface of the slider 15 with the polishing material 404. In polishing, because the film thickness of the sacrificial interconnect 601 becomes thinner and thinner, the electrical resistance gradually becomes greater. This can be monitored by the ohmmeter 602, and thus the polishing step can be more stably performed.

Although a magnetic element is not shown in the near field optical head 2 according to the embodiment, the head can of course meet recording and reproduction by light as well as meet the hybrid magnetic recording method by the combination of the magnetic element.

Embodiment 2

Next, embodiment 2 of the invention will be described with reference to FIGS. 7 to 9. In addition, in embodiment 2, for the same configuration as that in embodiment 1, the same numerals and signs are designated to omit the explanations.

Figure 7:
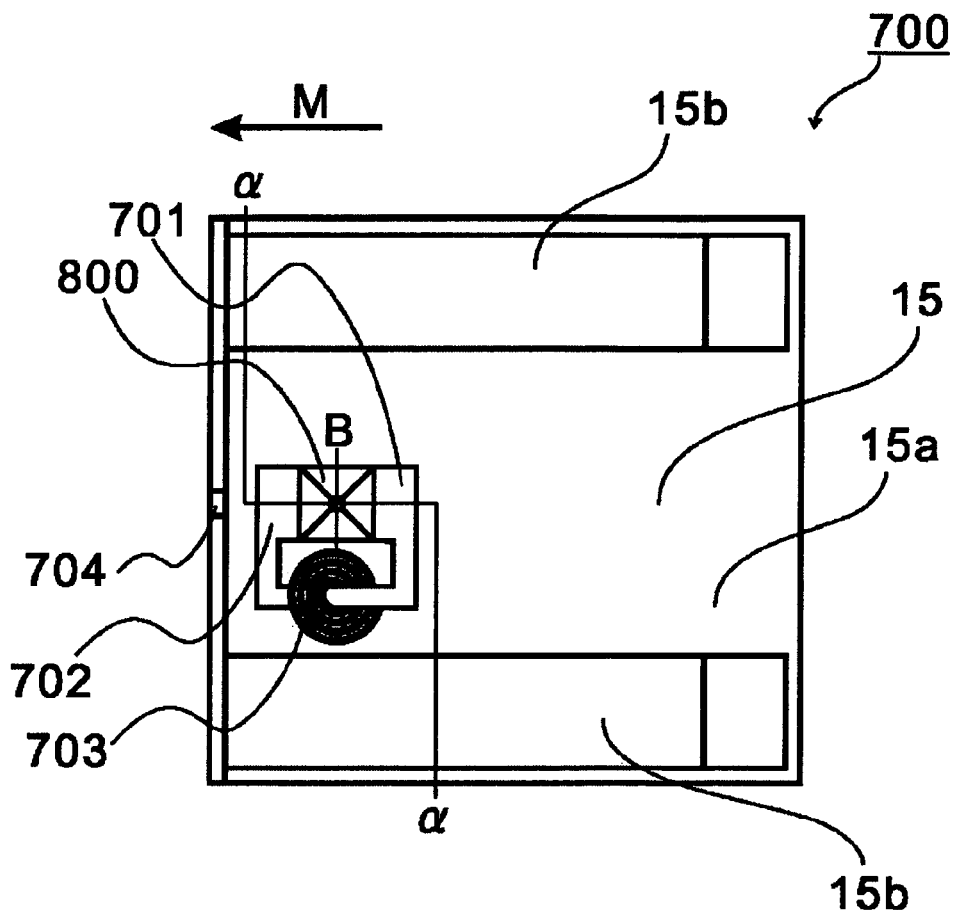
FIG. 7 is a bottom view depicting a near field optical head according to embodiment 2 of the invention.
Figure 8:
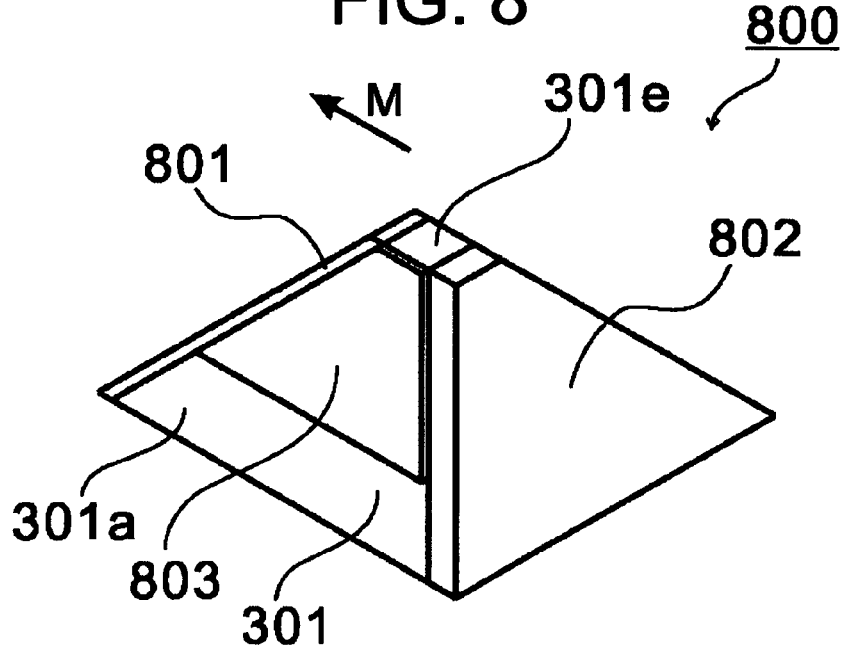
FIG. 8 is a perspective view depicting a near field optical element according to embodiment 2 of the invention.

FIG. 7 shows a bottom view depicting a near field optical head 700 according to the embodiment. In addition, FIG. 8 shows a schematic diagram depicting a near field optical element 800 according to the embodiment. Although the embodiment has almost the similar configuration of embodiment 1, the main difference is in that yokes 701 and 702 and a coil 703 are added.

An truncated quadrangular pyramid 301 arranged on an opposed surface 15a of a slider 15 is configured of four side surfaces 301a, 301b, 301c, and 301d and a top face 301e facing to a disk D. Among the four side surfaces, on the two side surfaces 301c and 301d arranged along the moving direction M of the disk D and facing to each other, a first metal film 801 and a second metal film 802 are formed, respectively. For the first metal film 801 and the second metal film 802, a soft magnetic material is used. At this time, when a soft magnetic material having a high saturation magnetic flux density is used, it is suited for recording at high recording density. The first metal film 801 and the second metal film 802 configure a magnetic head that generates leakage flux. The top face 301e is a rectangle, and the length of each side ranges from a few hundreds nm to a few tens nm or below. Thus, the first metal film 801 and the second metal film 802 have a clearance (magnetic gap) near the top face 301e, and the size ranges from a few hundreds nm to a few tens nm or below. In addition, on the side surface 301a adjacent to the side surface 301c and the side surface 301d, a third metal film 803 is formed. The third metal film 803 is formed of a metal material such as Au or Ag. At the side contacted with the top face 301e of the third metal film 803, near field light is localized.

To the first metal film 801 and the second metal film 802, the yokes 701 and 702 provided on the opposed surface 15a of the slider 15 are connected, respectively. The yokes 701 and 702 are connected to each other on the opposed surface 15a of the slider 15, and the connecting portion thereof is a vertical circuit part (not shown in the drawing) bent along the direction vertical to the opposed surface 15a of the slider 15. The coil 703 is provided on the opposed surface 15a of the slider 15 so as to spirally wind around the vertical circuit part. At this time, the coil 703 is insulated between the adjacent wire materials, the yokes 701 and 702. The yokes 701 and 702 are a soft magnetic material. For them, a material such as permalloy may be used, because a high saturation magnetic flux density is unnecessary as the first metal film 801 and the second metal film 802 are required. In addition, for the coil 703, a material having a small electrical resistance such as Cu is used. In addition, this coil 703 is electrically connected to a control unit 8 through a suspension 3 and a carriage 11, and current modulated according to information is supplied thereto from the control unit 8. In other words, the yokes 701 and 702 and the coil 703 configure an electromagnet as a whole. Therefore, the leakage flux is generated between the first metal film 801 and the second metal film 802, and the hybrid magnetic recording method is implemented together with the near field light generated by the third metal film 803. In addition, on the end surface (outlet end) on the downstream side of the moving direction M of the head 700, a magnetic resistance element 704 is provided to read magnetic information on the disk D.

Figure 9:
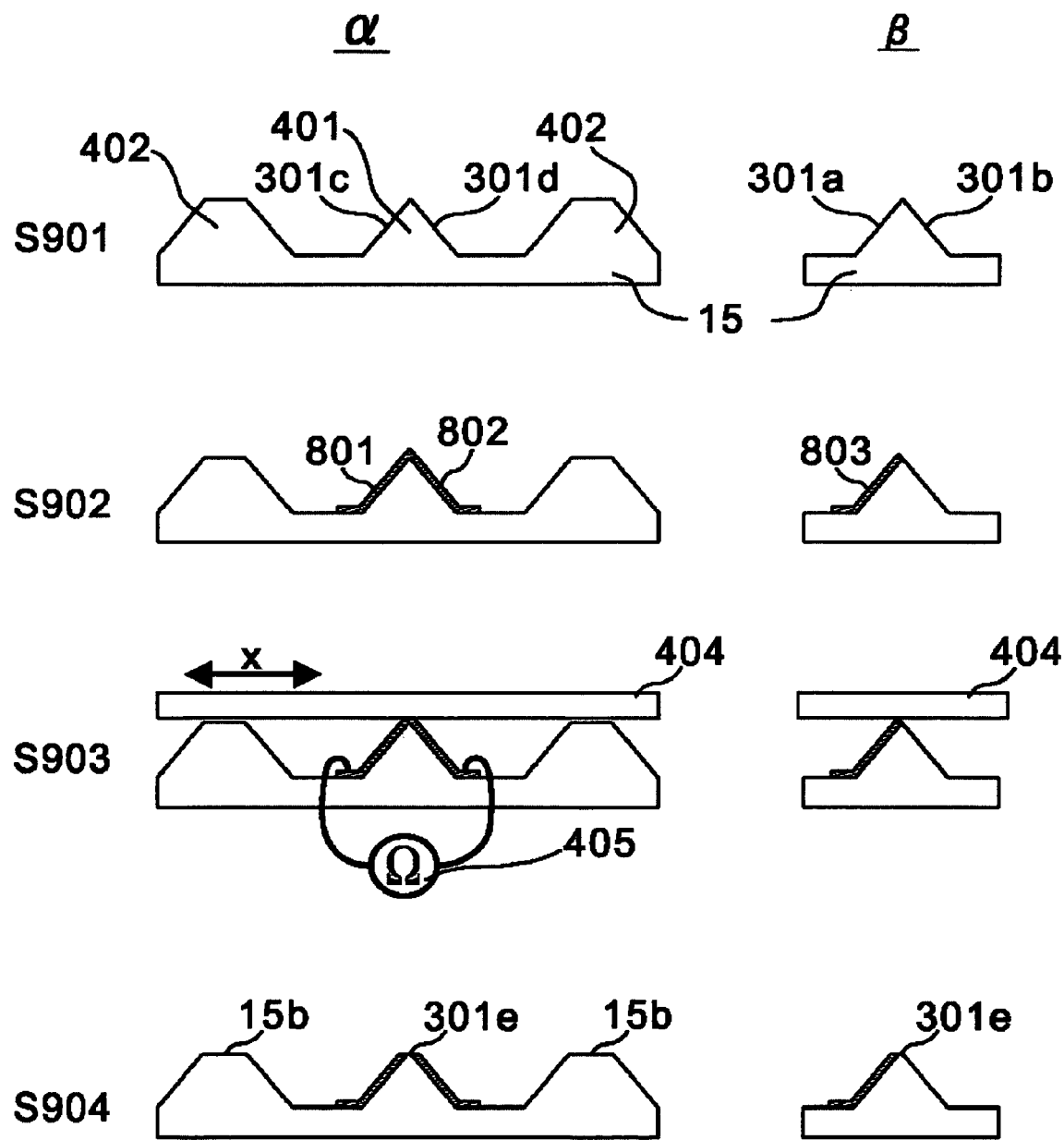
FIG. 9 are cross-sectional views depicting a method of fabricating the near field optical element and the near field optical head according to embodiment 2 of the invention.

FIG. 9 shows cross sections depicting a method of fabricating the near field optical element and the near field optical head according to the embodiment. Here, for clarifying the main points of the embodiment, as shown in FIG. 7, a section crossing two ABSs 15b, crossing the first metal film 801, the second metal film 802 and the top face 301e, and perpendicular to the top face 301e is a cross section α. In addition, a section crossing the third metal film 803, the side surface 301b not covered with the metal film, and the top face 301e, and perpendicular to the top face 301e is a cross section β. In FIG. 9, cross sections in the cross section α are shown on the left in the drawing, and in FIG. 9, cross sections in the cross section β are shown on the right in the drawing.

First, as shown in Step S901, it is the same in embodiment 1 that the slider 15 is prepared, which is formed on the surface with a quadrangular pyramid 401 to be the truncated quadrangular pyramid 301 after the fabrication process steps are finished, and the top face of a truncated quadrangular pyramid 402 to be the ABS 15b after the fabrication process steps are finished.

Subsequently, as shown in Step S902, the first metal film 801, the second metal film 802, and the third metal film 803 are formed. As similar to embodiment 1, this can be implemented in which deposition of the sacrificial layer, deposition of the metal film, and the lift-off process are repeated, and lastly, only the metal film on the quadrangular pyramid 401 is left.

Subsequently, as shown in Step S903, a polishing material 404 is arranged in parallel with the slider 15, and as indicated by X in FIG. 9, the polishing material 404 is moved in parallel with one surface of the substrate to polish the surface of the slider 15 for removing the metal film formed near the top. At this time, an ohmmeter 405 is connected to the first metal film 801 and the second metal film 802. As similar to embodiment 1, this connection is performed through a conductive interconnect (not shown in the drawing) arranged on the opposed surface 15a of the slider 15. Although the first metal film 801 and the second metal film 802 are electrically connected to each other near the top of the quadrangular pyramid 401, as different from embodiment 1, the first metal film 801 and the second metal film 802 are electrically connected to each other also through the third metal film 803. However, when polishing is conducted until the top of the quadrangular pyramid 401 is brought into contacted with the polishing material 404, the first metal film 801 and the second metal film 802 are not contacted with each other. At this time, because the resistance value measured by the ohmmeter 405 is changed, the moment at which the top of the quadrangular pyramid is brought into contacted with the polishing material 404 can be determined.

When the polishing is continued slightly from the moment, as shown in Step S904, the top of the quadrangular pyramid 401 is cut to form the top face 301*e*. In addition, the top face of the truncated quadrangular pyramid 402 is similarly cut to form the ABSs 15*b*. At this time, the top face 301*e* and the ABSs 15*b* are in the same plane.

According to the embodiment, even though any of the side surfaces are covered with the metal film among four side surfaces of the truncated quadrangular pyramid 301 of the near field optical element 800, the advantages similar to those of embodiment 1 are provided.

The change in the resistance value measured by the ohmmeter 405 in Step S903 in the embodiment is smaller than that in embodiment 1. Then, similarly to embodiment 1, a sacrificial interconnect is provided on the ABS 15*b* to more reliably determine the moment at which the top of the quadrangular pyramid 401 is brought into contact with the polishing material 404.

Figure 10:
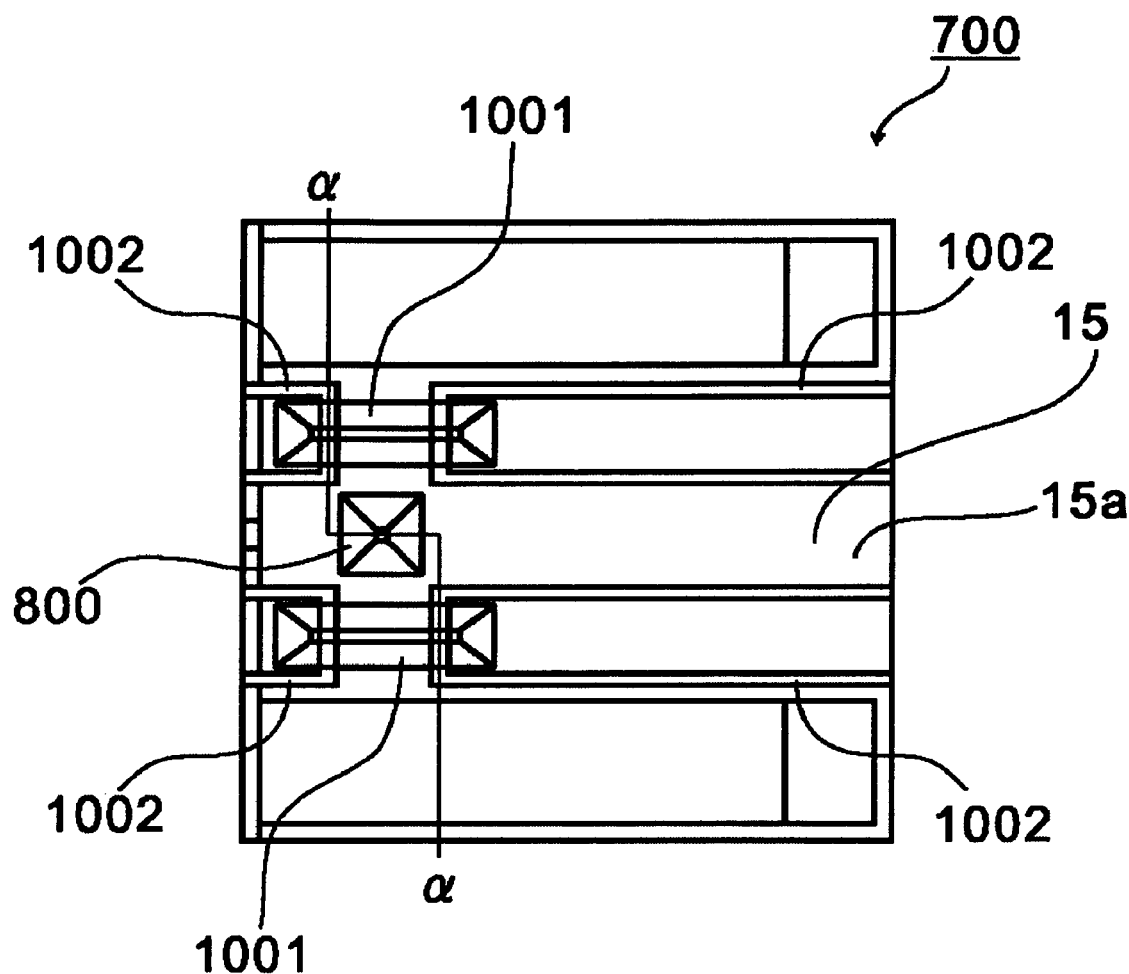
FIG. 10 is a bottom view depicting a near field optical head according to embodiment 2 of the invention.
Figure 11:
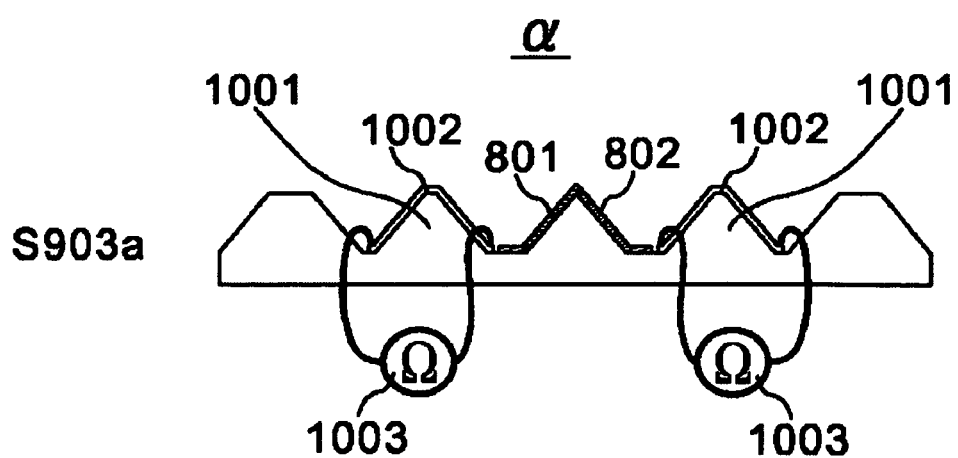
FIG. 11 is a cross-sectional view depicting another method of fabricating the near field optical element and the near field optical head according to embodiment 2 of the invention.

Moreover, as shown in FIG. 10, near the near field optical element 800, truncated quadrangular pyramids 1001 (different projections) are provided for measurement having a height almost the same height of the quadrangular pyramid 401, and a sacrificial interconnect 1002 is provided thereon, whereby the moment at which the top of the quadrangular pyramid 401 is brought into contact with the polishing material 404 can be determined more accurately. The sacrificial interconnect is provided from above the truncated quadrangular pyramid 1001 for measurement to over the opposed surface 15*a* of the slider 15, reaching the end part of the slider 15. As shown in Step S903*a* in FIG. 11, the sacrificial interconnect 1002 is connected to an ohmmeter 1003 for similar polishing. In polishing, because the film thickness of the sacrificial interconnect 1002 on the truncated quadrangular pyramid 1001 for measurement becomes thinner and thinner, the electrical resistance becomes gradually greater. Because this can be monitored by the ohmmeter 1003, the polishing step can be more stably performed. In FIG. 10, two rectangular truncated quadrangular pyramids 1001 for measurement seen from the top are provided. However, some configurations can be selected such as the provision of three square truncated quadrangular pyramids 1001 for measurement seen from the top so as to surround the near field optical element 800.

Figure 12:
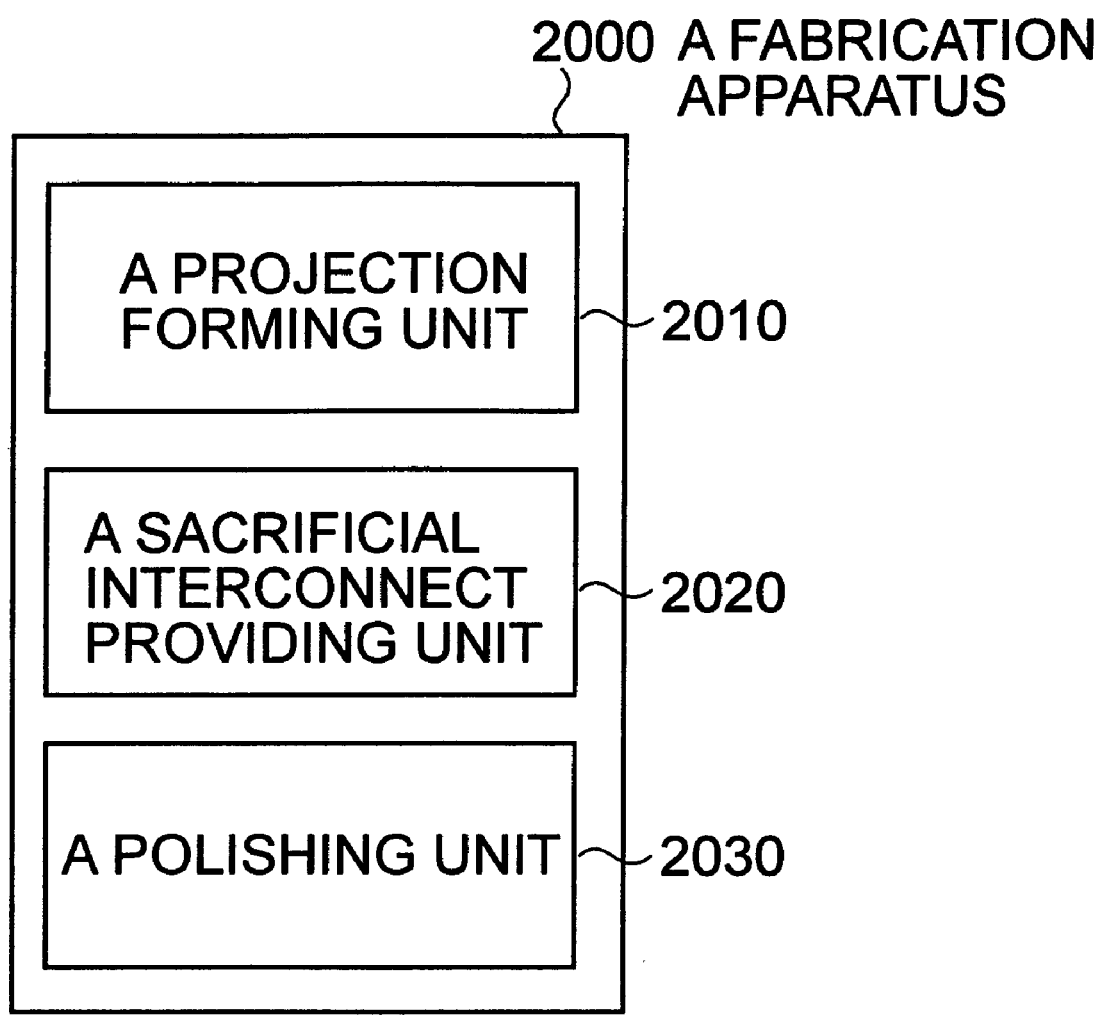
FIG. 12 is a block diagram depicting the schematic configuration of a fabrication apparatus according to a modification of the invention.

In addition, the method of fabricating the near field optical element described in each of the embodiments can be adapted to a fabrication apparatus as it is. As shown in FIG. 12, more specifically, a fabrication apparatus 2000 of the near field optical element has a projection forming unit 2010, a sacrificial interconnect providing unit 2020, and a polishing unit 2030. On one surface of the substrate, the projection forming unit 2010 forms a first projection to be a truncated pyramid after processing, and second projections to be a floating projection after processing. The sacrificial interconnect providing unit 2020 arranges at least a part of the sacrificial interconnect on the top of any one of the first projection and the second projection. The polishing unit 2030 uses a polishing material to polish the first projection, the second projection, and the sacrificial interconnect until the value of electrical resistance of the sacrificial interconnect reaches a predetermined value so that the top face of the near field optical element is in a predetermined size and the top face and the air bearing surfaces are arranged on the same plane. Since the fabrication method discussed in each of the embodiments described above can be adapted to the fabrication apparatus 2000 as it is, the detailed descriptions are omitted.

According to the invention, the near field optical element can be fabricated with high accuracy and in large quantity.

The invention claimed is:

1. A method of fabricating a head using near field light, the head comprising an air bearing surface that faces a surface of a recording medium and a near field optical element having a truncated pyramid including a top surface that faces the surface of the recording medium and a plurality of side surfaces, the method comprising:
   a step of forming on a surface of a substrate a first projection having the top surface and the plurality of side surfaces and corresponding to the truncated pyramid of the near field optical element, and a second projection for the air bearing surface;
   a step of forming a metal film on at least a first side surface of the plurality of side surfaces of the first projection;
   a step of providing at least a part of a sacrificial interconnect on anyone of the first projection and the second projection;
   a step of disposing on the surface of the substrate a conductive interconnect electrically connected to the sacrificial interconnect;
   a step of electrically connecting the conductive interconnect to an electrical resistance detecting unit;
   a step of arranging a flat polishing material so as to face the surface of the substrate; and
   a step of polishing the first projection, the second projection, and the sacrificial interconnect using the polishing material until a value of an electrical resistance of the sacrificial interconnect detected by the electrical resistance detecting unit reaches a predetermined value so that the top surface of the first projection has a predetermined size and is arranged on the same plane as that of the air bearing surface.

2. A method of fabricating a head using near field light according to claim 1; wherein the step of forming the metal film comprises:
   a step of depositing a sacrificial layer on at least a second side surface of the plurality of side surfaces of the first projection facing the first side surface and from a direction perpendicular to the second side surface;
   a step of depositing the metal film at least on the first side surface of the first projection; and
   a step of removing the sacrificial layer deposited on the second side surface of the first projection.

3. A method of fabricating a head using near field light according to claim 1; wherein in the polishing step, the metal film is polished together with the first projection, second projection and sacrificial interconnect until an end surface of the polished metal film is arranged on the same plane as the top surface of the first projection.

4. A method of fabricating a head using near field light according to claim 1; wherein the second projection comprises a floating projection having the air bearing surface; and wherein in the providing step, at least a part of the sacrificial interconnect is formed on a top surface of the second projection.

5. A method of fabricating a head using near field light according to claim 1; wherein the first projection has an element projection corresponding to the near field optical element and another projection different from the element projection; and wherein in the providing step, at least a part of the sacrificial interconnect is formed on a top surface of the another projection.

6. A method of fabricating a head using near field light according to claim 1; wherein the first projection has an element projection corresponding to the near field optical element and another projection different from the element projection; and wherein in the providing step, at least a part of the sacrificial interconnect is formed on the top surface of the element projection.

7. A method of manufacturing a near-field optical head, comprising:
    a step of forming on the surface of a substrate a first projection shaped in a quadrangular pyramid for providing a near-field optical element of the near-field optical head;
    a step of forming on a surface of a substrate a second projection shaped in a frustum of quadrangular pyramid for providing an air bearing surface of the near-field optical head;
    a step of forming a metal film on at least one surface of the first projection;
    a step of connecting the metal film with a resistance meter through a conduction wiring for detecting an electrical resistance of the metal film; and
    a step of polishing the first and second projections and the metal film while the resistance meter detects an electrical resistance of the metal film and until the detected electrical resistance reaches a predetermined value such that a top surface of the first projection has a specified size and becomes flush with a surface of the second projection providing the air bearing surface.

8. A method according to claim 7; wherein in the polishing step, a top surface of the polished metal film becomes flush with the top surface of the polished first projection and the surface of the polished second projection.

9. A method according to claim 7; further comprising the step of arranging a flat polishing material so as to confront the surface of the substrate; and wherein the polishing step comprises polishing the first and second projections using the flat polishing material.

10. A method according to claim 7; wherein the step of forming the metal film comprises the steps of depositing a sacrificial layer on another surface of the first projection, depositing the metal film on the at least one surface of the projection, and removing the sacrificial layer deposited on the another surface of the first projection.

* * * * *